United States Patent

Sosa

[15] 3,689,116
[45] Sept. 5, 1972

[54] REMOTE CONTROL FOR OPERATING VEHICLE DOOR LATCHES

[72] Inventor: Pedro Baez Sosa, New York, N.Y.

[73] Assignee: Efficient Instruments Corporation, Long Island City, N.Y.

[22] Filed: March 29, 1971

[21] Appl. No.: 128,929

[52] U.S. Cl. .................................296/146, 292/1
[51] Int. Cl. ............................................B60j 5/04
[58] Field of Search......296/146, 24 R; 292/1, 336.3; 49/357, 302; 180/112, 113

[56] References Cited

UNITED STATES PATENTS

| | | | |
|---|---|---|---|
| 2,796,271 | 6/1957 | Darmstadter | 292/1 |
| 3,549,195 | 12/1970 | Kallinikos | 296/24 R |
| 3,317,231 | 5/1967 | Lindquist et al. | 292/336.3 |
| 3,084,757 | 4/1963 | Oishei et al. | 180/112 |
| 3,547,217 | 12/1970 | Garza | 296/24 R |

Primary Examiner—Benjamin Hersh
Assistant Examiner—John A. Pekar
Attorney—Michael S. Striker

[57] ABSTRACT

An automobile has a body the passenger compartment of which is provided with a front seat and a rear seat. At least one front door and one back are provided affording access to the front and rear seat, respectively. A partition is located intermediate and separates the front seat from the rear seat. Latch means is located rearwardly of the partition movable between a first and second position in which it respectively locks and unlocks the rear door. Remote control means is provided including one portion which engages the latch means and another portion which is located forwardly of the partition and which cooperates with the one portion, being engageable by a person in the front seat so that the latch means for the rear door can be moved between its first and second positions by remote control from the front seat.

10 Claims, 3 Drawing Figures

PATENTED SEP 5 1972 3,689,116
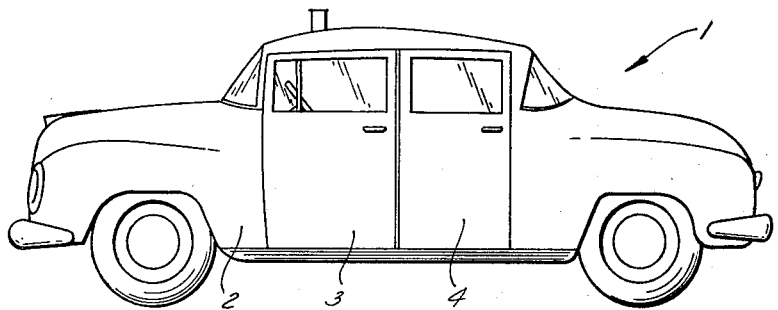
FIG. 1
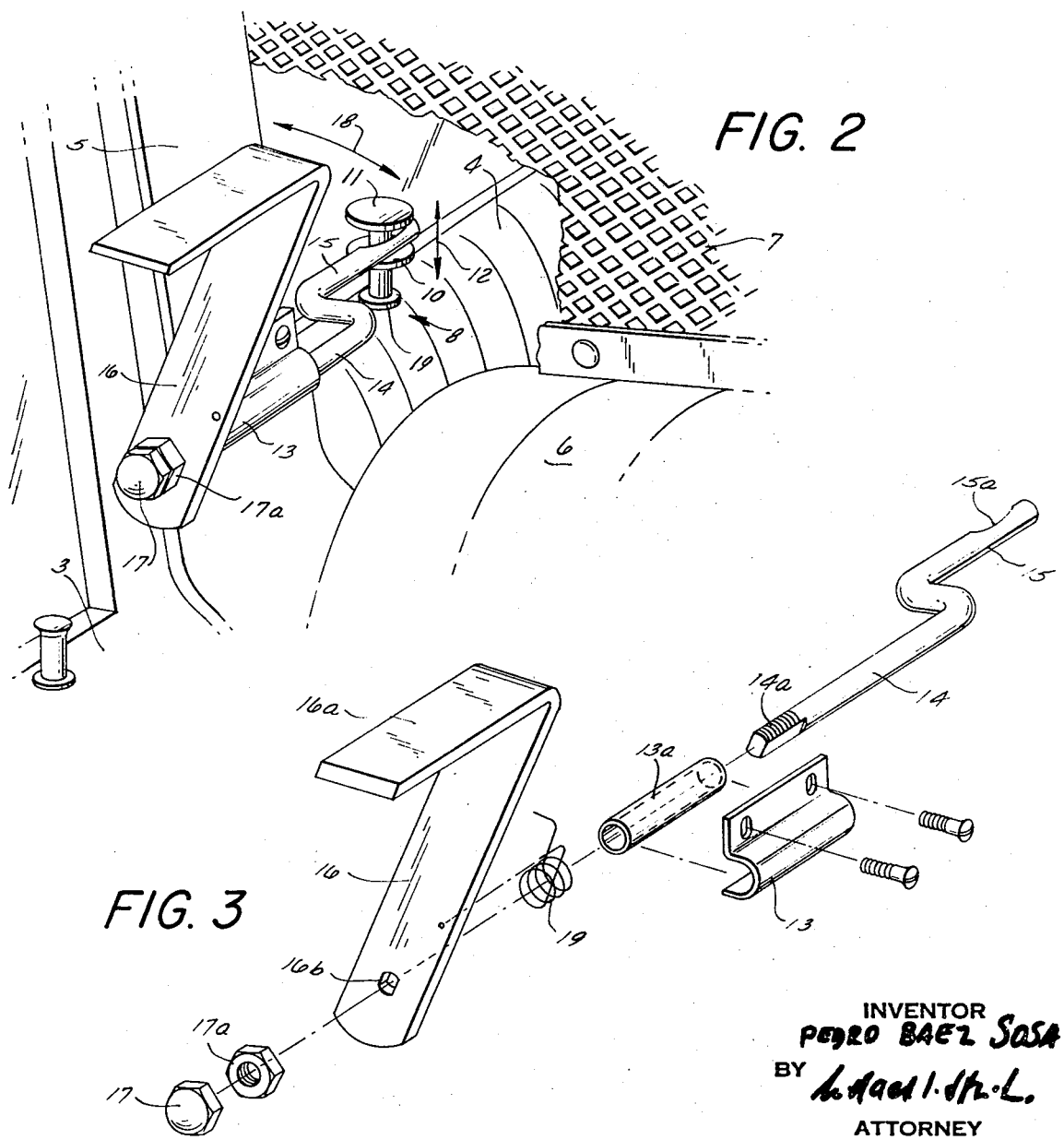
FIG. 2
FIG. 3
INVENTOR
PEDRO BAEZ SOSA
BY
ATTORNEY 3,689,116

REMOTE CONTROL FOR OPERATING VEHICLE DOOR LATCHES

BACKGROUND OF THE INVENTION

The present invention relates generally to automobile constructions, and more particularly to a remote control arrangement for a rear door latch on an automobile.

The provision of latches on automobile doors, to lock the doors or, putting it another way, to disable the handle of the door so as to prevent unintentional opening of the door for instance when the vehicle is in motion, is already well known. Such devices are most commonly in form of pushbuttons which can be raised to unlatch the mechanism and which are depressed to latch the mechanism and lock the door against unintentional opening. Unfortunately, although such devices are provided as a matter of routine on all passenger automobiles, they are frequently not used by the passengers. This means that the safety potentially afforded the passenger by the provision of the handle-disabling latch means has been wasted by the lack of motivation to utilize it.

This is a problem which is particularly prevalent in taxicabs where passengers very rarely think to use the latch means provided, but where the cab driver may under certain circumstances be held responsible for the lack of utilization of this safety device, the reasoning being that the device is a part of his vehicle and that it is his responsibility to see that it is used. But the recent trend towards installing partitions between the front seat and the rear seat, to protect the driver from the possibility of attack by a passenger seeking to take his money, the opportunities available to a cab driver to see to it that the vehicle safety latches are used have become even more restricted. In fact, it is now not possible at all to operate these safety latches himself without having to leave the cab, instruct a passenger to roll down the rear window, operate the latch, have the passenger roll up the rear window again and resume his position behind the wheel of the vehicle. Obviously this is not feasible.

SUMMARY OF THE INVENTION

It is, accordingly, an object of the present invention to overcome the aforementioned disadvantages.

More particularly it is an object of the invention to provide an arrangement by means of which the person or persons in the front seat of a passenger vehicle can, by remote control, operate safety latches on the rear door or doors of the vehicle.

A concomitant object of the invention is to provide such an arrangement which is particularly suitable for use on taxicabs, although its use is by no means intended to be restricted to such an application.

Still another object of the invention is to provide such an arrangement which is simple and therefore inexpensive to construct and install, and which is reliable in its operation.

In pursuance of the above objects, and others which will become apparent hereafter, one feature of the invention resides, briefly stated, in an automobile body having a passenger compartment provided with a front seat and rear seat. At least one front door and one back door are provided which respectively afford access to the front seat and the rear seat. A partition is located intermediate and separates the front seat from the rear seat and latch means is located rearwardly of the partition and is movable between a first and a second position in which it respectively locks and unlocks the rear door. Finally, I provide remote control means which includes one portion which engages the latch means and another portion forwardly of the partition and cooperating with the one portion. The other portion is movable between one and an other position in which the one portion moves the latch means to the first and second positions thereof, respectively.

The novel features of the invention which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic perspective illustrating a vehicle provided with my invention;

FIG. 2 is a fragmentary enlarged perspective detail view of portions of FIG. 1, showing the invention in detail; and FIG. 3 is an exploded perspective illustrating the constituent components of my arrangement.

DESCRIPTION OF THE PREFERRED EMBODIMENTS

Discussing firstly FIG. 1 it will be seen that I have there illustrated diagrammatically an automobile 1 having a body 2 provided with a passenger compartment 2'. The passenger compartment has a front seat and a rear seat (not shown) with a front door 3 affording access to the front seat and a rear door 4 affording access to the rear seat. Of course normally such an automobile will have two front doors 3, one located at either side, and similarly two back doors 4 again one located at either side. This will be understood without a specific illustration.

In FIG. 2 I have illustrated the front seat and a lateral pillar 5 which is located between the front doors and the rear doors, that is the front door 3 and the rear door 4 on each side. The front seat 6 is separated from the non-illustrated rear seat by a partition 7 which may be apertured as shown, and which is installed—it being assumed that the invention is explained by means of its use on a taxicab—to prevent access of a passenger to the driver in the front seat.

In conventional manner the rear door 4 shown (and this is of course true of both rear doors usually) is provided with a latch button 8 which can be raised and lowered as indicated by the double-headed arrow 12. However, in accordance with the present invention the conventional latch button, which has a stem and a single top flange, is replaced with the illustrated latch button which has a stem 9 and two vertically spaced transverse flanges 10 and 11. Such latch buttons are usually threaded onto a threaded actuating rod located within the door and accessible through an opening provided for this purpose, and the latch button 8 according to the present invention can be substituted for the one conventionally provided by unscrewing the one which is normally provided and replacing it with the latch button 8.

Mounted on the pillar 5 is a bracket 13 which is screwed or otherwise secured to the pillar 5 and has a hollow tubular portion as illustrated. However it is also possible to journal or stationarily mounted within the hollow tubular portion shown a separate tubular portion 14a such as is shown in FIG. 3. In any case, there is provided displacing means here in form of an elongated angled first arm 14 a portion of which extends through the tubular portion 13 and/or 13a, and an angled portion 15 of which engages between the flanges 10 and 11 of the latch button 8. The first arm portion 14 of course is now turnable about the longitudinal axis of the tubular portion 13 and/or 13a, that is about a substantially horizontal axis.

That portion of the first arm 14 which projects beyond the tubular portion 13 and/or 13a is engaged by activating means in form of a second angled arm 16 a portion 16a of which is bent so as to extend at a desired angle, usually normal to the remainder of the arm. The arm 16 is connected to the arm 14 by means of the nuts 17, 17a or, if desired, in another suitable manner. The arm 16, 16a is located in its entirety forwardly of the partition 7, that is at the side of the partition 7 which is visible from the front seat 6, and it will be understood that the partition 7 will normally extend across the entire width of the vehicle from one of the pillars 5 to the opposite pillar 5. The arm 16, 16a can be moved in the direction of the double-headed arrow 18 by gripping the portion 16a and turning the arm about the horizontal axis defined by the longitudinal axis of the portions 13 and/or 13a, whereby the arm 14, 15 will similarly move and, in so doing, will urge the latch button 8 upwardly in the direction of the arrow 12 when the arm 16, 16a is moved towards the right in FIG. 2, and downwardly in the direction of the arrow 12 when the arm 16, 16a is moved towards the left in FIG. 2. In so doing it either engages the flange 11 or the flange 10, to thereby effect such movement of the latch button 8. The spring 19, shown in FIG. 3, cooperates with the arm 16, 16a and the arm 14, 15 in a sense urging them to a position in which the portion 15 of the arm 14, 15 will always abut against the stem of the latch button 8, intermediate the flanges 10 and 11 in the manner illustrated. The portion 15 is provided with a recess 15a as shown in FIG. 3 to facilitate this permanent engagement. A portion 14a of the arm 14 is of polygonal cross-sectional configuration and extends through a similarly configured cut-out 16b of the arm 16 to connect the arm 16, 16a with the arm 14, 15 for joint movement. The portion 14a is advantageously externally screw-threaded so that the nuts 17a and cap nut 17 can mesh therewith and thereby connect the two arms with one another in the manner shown in FIG. 2.

It will be appreciated that it is now a simple matter for a person in the front seat of the vehicle, for instance the driver of a taxicab, to lock the rear door or doors of his vehicle against undesired and unintentional opening simply by turning the arm 16, 16a in the requisite sense. Arrived at his destination, the driver can then unlock the doors in the same manner by turning the arm 16, 16a in the opposite direction. Similarly, in circumstances where the driver may be confronted with a potential passenger who appears suspicious, that is whom he suspects of intending to attack him once entry to the vehicle is gained, the driver can bar such entry by locking the rear doors from his seat by remote control in the manner already discussed.

The potential benefits in terms of increased passenger safety and, under certain circumstances, increased safety for the driver will be clearly evident without further elaboration.

It will be understood that each of the elements described above, or two or more together, may also find a useful application in other types of constructions differing from the types described above.

While the invention has been illustrated and described as embodied in a remote control for vehicle door latches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an automobile, in combination,
    a body having a passenger compartment provided with a front seat and a rear seat;
    at least one front door and one back door affording access to said front seat and said rear seat, respectively said back door being movable between a closed and an open position;
    a partition intermediate and separating said front seat from said rear seat;
    latch means provided on said back door and movable between a first and a second position in which it respectively locks and unlocks said back door; and
    remote control means including displacing means for displacing said latch means, said displacing means projecting into the path of said latch means and cooperating with the same when said back door at least approaches said closed position thereof, and activating means provided forwardly of said partition and cooperating with said displacing means, said activating means being movable between one and an other position in which said displacing means move said latch means to said first and second positions thereof, respectively, said latch means and said displacing means being in operative association only when said back door at least approaches said closed position.

2. A combination as defined in claim 1, said latch means being disengaged from said displacing means when said back door is open.

3. In an automobile as defined in claim 1, wherein said latch means comprises a latching button movable vertically between said first and second positions thereof.

4. In an automobile as defined in claim 3, wherein said remote control means comprises a tubular portion extending from rearwardly to forwardly of said partition and being stationarily mounted, an angled first arm constituting said displacing means engaging said latch means and in part extending through and beyond said tubular portion, and an angled second arm constituting said activating means and being fast with said first arm where the same extends beyond said tubular portion.

5. In an automobile as defined in claim 4; and further comprising spring means permanently urging said first arm into engagement with said latch means.

6. In an automobile as defined in claim 5, wherein said latching button has an upright stem and a pair of vertically spaced flanges extending transversely of said stem; and wherein said first arm has one end portion engaging said stem intermediate said flanges.

7. In an automobile as defined in claim 6, said tubular portion having a substantially horizontally oriented longitudinal axis, and said first arm having an other end portion angled with respect to said one end portion and being turnable about said axis with concomitant displacement of said one end portion in a sense engaging a respective one of said flanges for displacing said button between said positions thereof, in dependence upon the direction of turning movement of said other end portion about said axis.

8. In an automobile as defined in claim 7, wherein said other end portion has a section projecting beyond said tubular portion forwardly of said partition and being of polygonal cross-section; and wherein said second arm is provided with a mating aperture of polygonal cross-section receiving said section.

9. In an automobile as defined in claim 8; and further comprising releasable connecting means connecting said section with said second arm.

10. In an automobile as defined in claim 9, wherein said releasable connecting means comprises nut means.

* * * * *